US009210606B2

United States Patent
Jung et al.

(10) Patent No.: US 9,210,606 B2
(45) Date of Patent: Dec. 8, 2015

(54) METHOD OF MEASURING CHANNEL QUALITY IN A WIRELESS ACCESS SYSTEM AND APPARATUS FOR SAME

(75) Inventors: Manyoung Jung, Anyang-si (KR); Suhwan Lim, Anyang-si (KR); Yoonoh Yang, Anyang-si (KR); Sangwook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 192 days.

(21) Appl. No.: 14/119,086

(22) PCT Filed: Jul. 30, 2012

(86) PCT No.: PCT/KR2012/006057
§ 371 (c)(1),
(2), (4) Date: Nov. 20, 2013

(87) PCT Pub. No.: WO2013/019046
PCT Pub. Date: Feb. 7, 2013

(65) Prior Publication Data
US 2014/0086095 A1   Mar. 27, 2014

Related U.S. Application Data

(60) Provisional application No. 61/513,647, filed on Jul. 31, 2011.

(51) Int. Cl.
*H04W 24/10* (2009.01)
*H04J 11/00* (2006.01)
(52) U.S. Cl.
CPC ........... *H04W 24/10* (2013.01); *H04J 11/0023* (2013.01); *H04J 11/0069* (2013.01)

(58) Field of Classification Search
CPC .. H04W 24/10; H04J 11/0023; H04J 11/0069
See application file for complete search history.

(56) References Cited

U.S. PATENT DOCUMENTS

2009/0209256 A1* 8/2009 Nakashima et al. .......... 455/436
2010/0067627 A1* 3/2010 Lincoln et al. ................ 375/346

(Continued)

FOREIGN PATENT DOCUMENTS

KR   10-2011-0084594 A   7/2011
WO   WO 2009/023860 A1   2/2009

(Continued)

*Primary Examiner* — Luat Phung
*Assistant Examiner* — Kai Chang
(74) *Attorney, Agent, or Firm* — Birch, Stewart, Kolasch & Birch, LLP

(57) ABSTRACT

The present invention relates to a method of measuring channel quality in a wireless access system and an apparatus for same. The method of measuring channel quality in a wireless access system includes the steps of: measuring channel quality using each CRS (cell-specific reference signal) transmitted in $0^{th}$, $4^{th}$, $7^{th}$ and $11^{th}$ OFDM (orthogonal frequency division multiplexing) symbols in each subframe from a base station; determining whether a channel quality measurement value of the $0^{th}$ OFDM symbol is greater by a preset first threshold than an average value of channel quality measurement values of the $4^{th}$, $7^{th}$ and $11^{th}$ OFDM symbols; and transmitting channel quality information.

10 Claims, 10 Drawing Sheets

(56) References Cited

U.S. PATENT DOCUMENTS

| | | | |
|---|---|---|---|
| 2010/0135242 A1* | 6/2010 | Nam et al. | 370/330 |
| 2010/0254471 A1* | 10/2010 | Ko et al. | 375/260 |
| 2010/0272004 A1* | 10/2010 | Maeda et al. | 370/312 |
| 2011/0007657 A1* | 1/2011 | Kazmi et al. | 370/252 |
| 2011/0122837 A1* | 5/2011 | Lin et al. | 370/329 |
| 2011/0134892 A1* | 6/2011 | Shirakabe et al. | 370/336 |
| 2011/0141928 A1* | 6/2011 | Shin et al. | 370/252 |
| 2011/0141987 A1* | 6/2011 | Nam et al. | 370/329 |
| 2011/0143675 A1* | 6/2011 | Damnjanovic et al. | 455/67.11 |
| 2011/0176634 A1* | 7/2011 | Yoon et al. | 375/295 |
| 2012/0009959 A1* | 1/2012 | Yamada et al. | 455/507 |
| 2012/0164948 A1* | 6/2012 | Narasimha et al. | 455/63.1 |
| 2013/0070719 A1* | 3/2013 | Xu et al. | 370/329 |
| 2013/0114562 A1* | 5/2013 | Seo et al. | 370/329 |

FOREIGN PATENT DOCUMENTS

| | | |
|---|---|---|
| WO | WO 2010/107129 A1 | 9/2010 |
| WO | WO 2011/074807 A2 | 6/2011 |

\* cited by examiner

FIG. 6
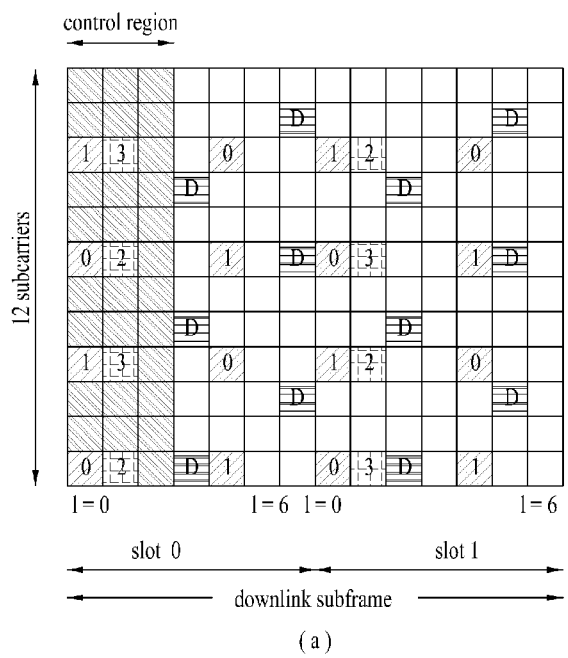
(a)
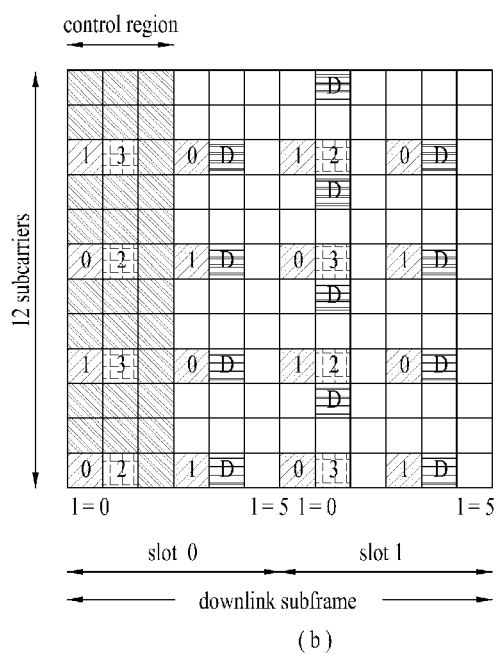
(b)

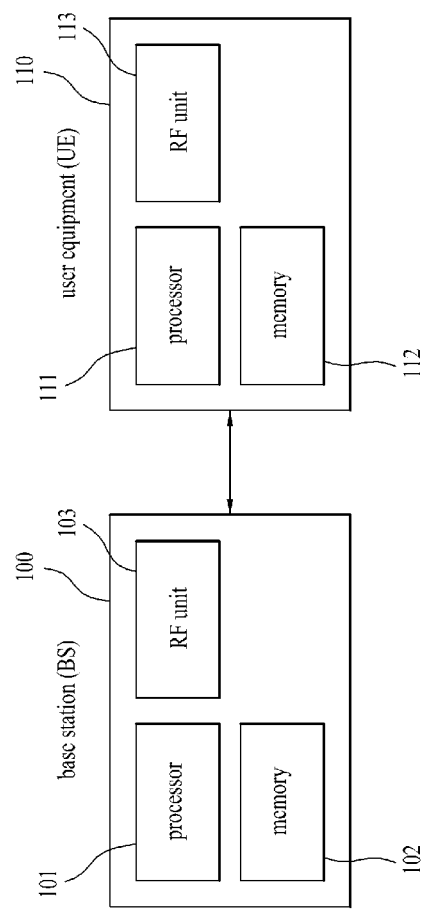

METHOD OF MEASURING CHANNEL QUALITY IN A WIRELESS ACCESS SYSTEM AND APPARATUS FOR SAME

CROSS REFERENCE TO RELATED APPLICATIONS

This application in the National Phase of PCT/KR2012/006057 filed on Jul. 30, 2012, which claims priority under 35 U.S.C. 119(e) to U.S. Provisional Application No. 61/513,647 filed on Jul. 31, 2011, all of which are hereby expressly incorporated by reference into the present application.

TECHNICAL FIELD

The present invention relates to wireless access system, and more particularly, to a method of measuring channel quality by using a downlink reference signal and an apparatus for supporting the same.

BACKGROUND ART

A wireless communication system has been developed to provide audio services while assuring activities of a user. However, the wireless communication system has been extended its coverage to data service as well as audio service, and has been currently developed to provide data services of high speed. More advanced wireless communication system has been required due to a lack of resources in the wireless communication system, which currently provides services, and a request of services of high speed from users.

One of important things in requirements of a next generation wireless access system should support a demand of a high data transmission rate. To this end, various technologies such as multiple input multiple output (MIMO), cooperative multiple point transmission (CoMP), and relay have been studied.

In order to allow a radio data request, which has been rapidly increased, application of heterogeneous network of a macro-pico or macro-femto has been increased. In this case, a pico cell or a femto cell is located within a macro coll. Under the circumstances, a problem occurs in that signals transmitted from each cell to a user equipment located at the edge of cells which are overlapped with each other act as mutual interference.

DISCLOSURE

Technical Problem

An object of the present invention devised to solve the conventional problem is to provide a method of allowing a user equipment to effectively measure channel quality in a heterogeneous network system and an apparatus for the same.

Another object of the present invention is to provide a method of effectively measuring reference signal received power (RSRP) or reference signal received quality (RSRQ) in a heterogeneous network system and an apparatus for the same.

Other object of the present invention is to provide a method of improving communication quality and increasing overall system capacity and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method of allowing a user equipment to measure channel quality in a wireless access system comprises the steps of measuring channel quality by using each CRS (cell-specific reference signal) transmitted at $0^{th}$, $4^{th}$, $7^{th}$ and $11^{th}$ OFDM (orthogonal frequency division multiplexing) symbols of each subframe from a base station; determining whether a channel quality measurement value at the $0^{th}$ OFDM symbol is greater as much as a predetermined first threshold value than an average value of channel quality measurement values of the $4^{th}$, $7^{th}$ and $11^{th}$ OFDM symbols; and transmitting channel quality information to the base station, wherein the channel quality information is an average value of the channel quality measurement values at $0^{th}$, $4^{th}$, $7^{th}$ and $11^{th}$ OFDM symbols when the channel quality measurement value of the $0^{th}$ OFDM symbol is not grater as much as the first threshold value than the average value of channel quality measurement values of the $4^{th}$, $7^{th}$ and $11^{th}$ OFDM symbols.

In another aspect of the present invention, a user equipment measuring channel quality in a wireless access system comprises a radio frequency (RF) unit configured to transmit and receive a radio signal; and a processor configured to measure channel quality by using each CRS (cell-specific reference signal) transmitted at $0^{th}$, $4^{th}$, $7^{th}$ and $11^{th}$ OFDM (orthogonal frequency division multiplexing) symbols of each subframe from a base station, determine whether a channel quality measurement value at the $0^{th}$ OFDM symbol is greater as much as a predetermined first threshold value than an average value of channel quality measurement values of the $4^{th}$, $7^{th}$ and $11^{th}$ OFDM symbols, and transmit channel quality information to the base station, wherein the channel quality information is an average value of the channel quality measurement values at $0^{th}$, $4^{th}$, $7^{th}$ and $11^{th}$ OFDM symbols when the channel quality measurement value of the $0^{th}$ OFDM symbol is not grater as much as the first threshold value than the average value of channel quality measurement values of the $4^{th}$, $7^{th}$ and $11^{th}$ OFDM symbols.

Preferably, it is determined whether the average value of the channel quality measurement values at the $4^{th}$, $7^{th}$ and $11^{th}$ OFDM symbols is greater than a predetermined second threshold value if the channel quality measurement value at the $0^{th}$ OFDM symbol is greater as much as the first threshold value than the average value of the channel quality measurement values at the $4^{th}$, $7^{th}$ and $11^{th}$ OFDM symbols, and the channel quality information is the channel quality measurement value at the $0^{th}$ OFDM symbol if the average value of the channel quality measurement values at the $4^{th}$, $7^{th}$ and $11^{th}$ OFDM symbols is smaller than the second threshold value.

Preferably, it is determined whether a subframe type of a cell, which measures the channel quality, is a multicast broadcast single frequency network (MBSFN) subframe if the average value of the channel quality measurement values at the $4^{th}$, $7^{th}$ and $11^{th}$ OFDM symbols is greater than the second threshold value, and the channel quality information is the average value of the channel quality measurement values at the $4^{th}$, $7^{th}$ and $11^{th}$ OFDM symbols if the subframe type of the cell, which measures the channel quality, is not the MBSFN subframe.

Preferably, the channel quality information is a value obtained by subtracting the average value of the channel quality measurement values at the $4^{th}$, $7^{th}$ and $11^{th}$ OFDM symbols from the channel quality measurement value at the $0^{th}$ OFDM symbol if the subframe type of the cell, which measures the channel quality, is the MBSFN subframe.

Preferably, the channel quality information is at least any one of reference signal received power (RSRP) and reference signal received quality (RSRQ).

Advantageous Effects

According to the embodiment of the present invention, the user equipment may effectively measure channel quality in the wireless access system, preferably a hetero generous network system.

Also, according to the embodiment of the present invention, the user equipment may effectively measure RSRP or RSRQ by identifying a multicast broadcast single frequency network (MBSFN) of a neighboring cell.

Also, according to the embodiment of the present invention, the user equipment may improve communication quality and increase overall system capacity by effectively measuring channel quality.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram illustrating a reference signal pattern mapped into a pair of downlink resource blocks (RBs) defined in a 3GPP LTE-A system;

FIG. 10 is a block diagram illustrating a communication apparatus according to one embodiment of the present invention.

BEST MODE FOR CARRYING OUT THE INVENTION

Figure 1:
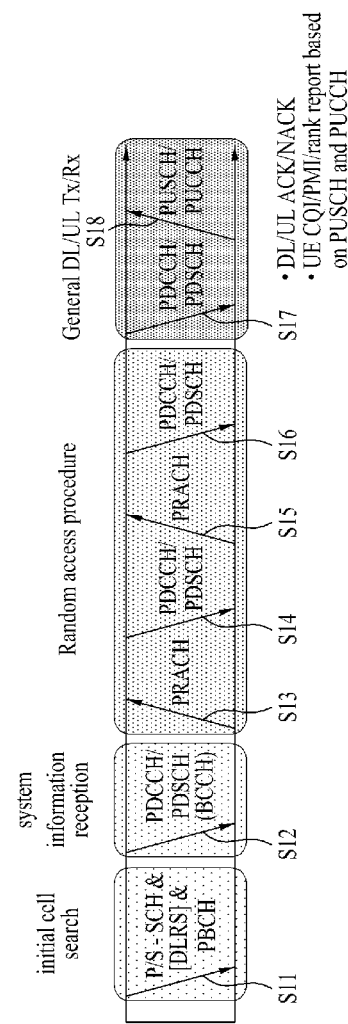
FIG. 1 is a diagram illustrating physical channels used in a 3GPP LTE system and a general method for transmitting a signal using the physical channels.

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus.

In this specification, the embodiments of the present invention have been described based on the data transmission and reception between a base station and a user equipment. In this case, the base station means a terminal node of a network, which performs direct communication with the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. At this time, the base station BS may be replaced with terms such as a fixed station, Node B, eNode B (eNB), and an access point (AP). A relay may be replaced with terms such as a relay node (RN) and a relay station (RS). Also, a terminal may be replaced with terms such as user equipment UE, a mobile station (MS), a mobile subscriber station (MSS), a subscriber station (SS), and station (STA).

Specific terminologies hereinafter used in the embodiments of the present invention are provided to assist understanding of the present invention, and various modifications may be made in the specific terminologies within the range that they do not depart from technical spirits of the present invention.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE For clarification of the description, although the following embodiments will be described based on the 3GPP LTE/LTE-A, it is to be understood that the technical spirits of the present invention are not limited to the 3GPP LTE/LTE-A.

1. General 3GPP LTE/LTE-A System to which the Present Invention May be Applied 1.1 General System FIG. 1 is a diagram illustrating physical channels used in a 3GPP LTE system and a general method for transmitting a signal using the physical channels.

The user equipment performs initial cell search such as synchronizing with the base station when it newly enters a cell or the power is turned on at step S11. To this end, the user equipment synchronizes with the base station by receiving a primary synchronization channel (P-SCH) and a secondary synchronization channel (S-SCH) from the base station, and acquires information such as cell ID, etc.

Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PD-CCH) and information carried in the PDCCH at step S12.

Afterwards, the user equipment may perform a random access procedure (RACH) such as steps S13 to S16 to complete access to the base station. To this end, the user equipment may transmit a preamble through a physical random access channel (PRACH) (S13), and may receive a response message to the preamble through the PDCCH and the PDSCH corresponding to the PDCCH (S14). In case of a contention based RACH, the user equipment may perform a contention resolution procedure such as transmission (S15) of additional physical random access channel and reception (S16) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S17) and transmit a physical uplink shared channel (PUSCH) and a physical uplink control channel (PUCCH) (S18), as a general procedure of transmitting uplink/downlink signals.

Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CQI (Channel Quality Information), a PMI (Precoding Matrix Indicator), RI (Rank Indication), etc.

Although the UCI is periodically transmitted through the PUCCH in the LTE system, it may be transmitted through the PUSCH if control information and traffic data should be transmitted at the same time. Also, the user equipment may non-periodically transmit the UCI through the PUSCH in accordance with request/command of the network.

Figure 2:
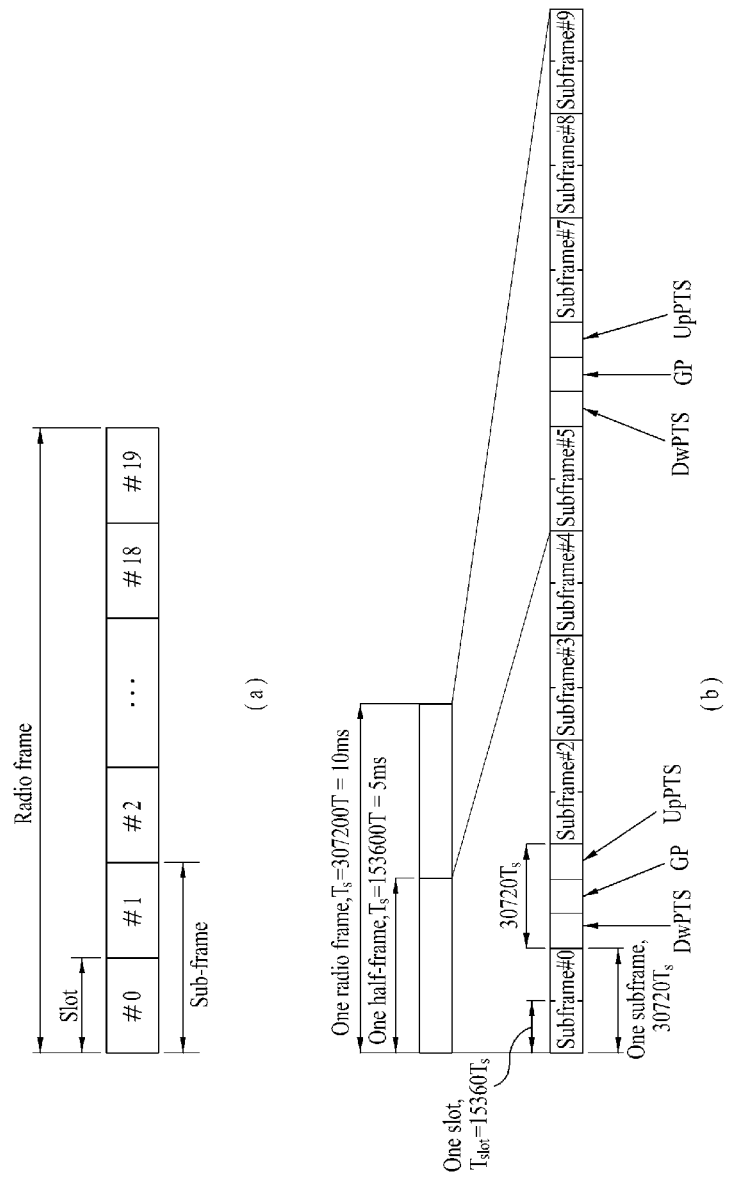
FIG. 2 is a diagram illustrating a structure of a radio frame in a 3GPP LTE system.

FIG. 2 is a diagram illustrating a structure of a radio frame in a 3GPP LTE system.

In a cellular OFDM wireless packet communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 2(a) is a diagram illustrating a structure of a type 1 radio frame. The downlink radio frame includes 10 subframes, each of which includes two slots in a time domain. A time required to trans it one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since OFDMA is used on a downlink in the 3GPP LTE system, OFDM symbols represent one symbol interval. The OFDM symbols may be referred to as SC-FDMA symbols or symbol interval. The resource block as resource allocation unit may include a plurality of continuous subcarriers in one slot.

The number of OFDM symbols included in one slot may be varied depending on configuration of CP. Examples of the CP include extended CP and normal CP. For example, if the OFDM symbols are configured by normal CP, the number of OFDM symbols included in one slot may be 7. If the OFDM symbols are configured by extended CP, since the length of one OFDM symbol is increased, the number of OFDM symbols included in one slot is smaller than that of OFDM symbols in case of normal CP. In case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 2(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One of the five subframes includes two slots. The DwPTS is used for initial cell search, synchronization or channel estimation at the user equipment. The UpPTS is used to synchronize channel estimation at the base station with uplink transmission of the user equipment. Also, the guard period is to remove interference occurring in the uplink due to multipath delay of downlink signals between the uplink and the downlink.

The aforementioned structure of the radio frame is only exemplary, and various modifications may be made in the number of subframes included in the radio frame, the number of slots included in the subframe, or the number of symbols included in the slot.

Figure 3:
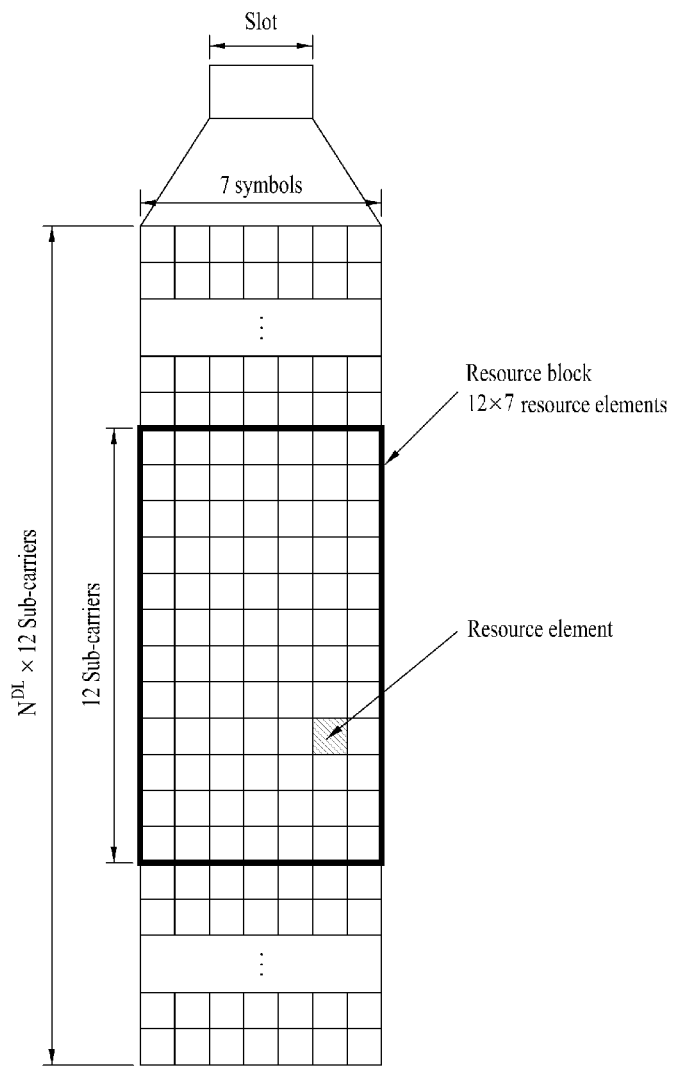
FIG. 3 is a diagram illustrating a resource grid of one downlink slot.

FIG. 3 is a diagram illustrating a resource grid of a downlink slot.

Referring to FIG. 3, the downlink slot includes a plurality of OFDM symbols in a time region. One downlink slot includes seven(six) OFDM symbols, and a resource block includes twelve subcarriers in a frequency domain.

Each element on the resource grid will be referred to as a resource element (RE). One resource block (RB) includes 12×7(6) resource elements. The number $N_{DL}$ of resource blocks (RBs) included in the downlink slot depends on a downlink transmission bandwidth. A structure of an uplink slot may be the same as that of the downlink slot.

Figure 4:
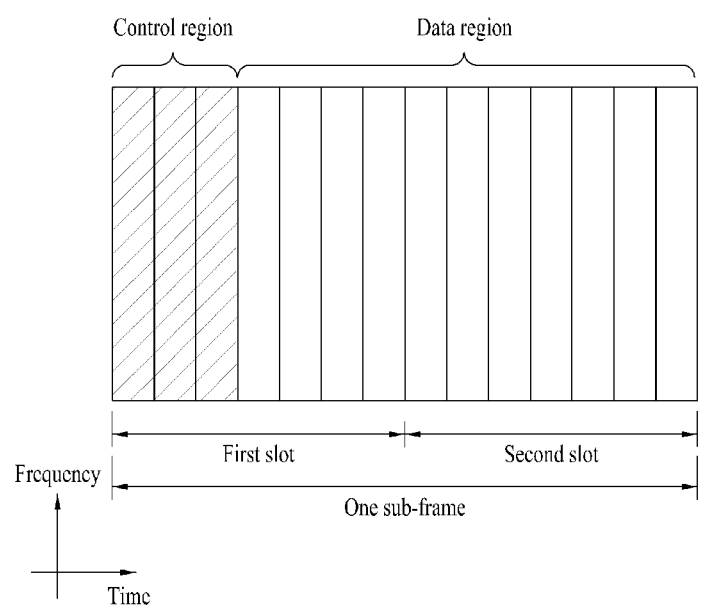
FIG. 4 is a diagram illustrating a structure of a downlink subframe.

FIG. 4 is a diagram illustrating a structure of a downlink subframe.

Referring to FIG. 4, maximum three OFDM symbols located at the front of the first slot of the subframe correspond to a control region to which control channels are allocated. The other OFDM symbols correspond to a data region to which a physical downlink shared channel (PDSCH) is allocated. Examples of the downlink control channel used in the 3GPP LTE include a PCFICH (Physical Control Format Indicator CHannel), a PDCCH (Physical Downlink Control CHannel), and a PHICH (Physical Hybrid ARQ Indicator CHannel).

The PCFICH is transmitted at the first OFDM symbol of the subframe, and carries information on the number (that is, the size of the control region) of OFDM symbols used for transmission of the control channel within the subframe. The PHICH is a response channel to the uplink, and carries ACK/NACK (acknowledgement/negative-acknowledgement) signal for HARQ (hybrid automatic repeat request). The control information transmitted through the PDCCH will be referred to as downlink control information (DCI). The DCI includes uplink resource allocation information, downlink resource allocation information, or uplink transmission (Tx) power control command for a random user equipment group.

The PDCCH may carry resource allocation and transport format (which may be referred to as downlink grant) of a downlink shared channel (DL-SCH), resource allocation information (which may be referred to as uplink grant) of an uplink shared channel (UL-SCH), paging information on a paging channel (PCH), system information on the DL-SCH, resource allocation information of upper layer control message such as random access response transmitted on the PDSCH, a set of transmission power control commands of individual user equipments within a random user equipment group, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). The format of the PDCCH and the number of bits of the PDCCH are determined depending on the number of CCEs.

The base station determines a PDCCH format depending on the DCI to be transmitted to the user equipment, and attaches cyclic redundancy check (CRC) to the control information. The CRC is masked (or scrambled) with an identifier (for example, radio network temporary identifier (RNTI)) depending on usage of the PDCCH or owner of the PDCCH. For example, if the PDCCH is for a specific user equipment, the CRS may be masked with an identifier (for example, cell-RNTI (C-RNTI)) of the corresponding user equipment. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 5:
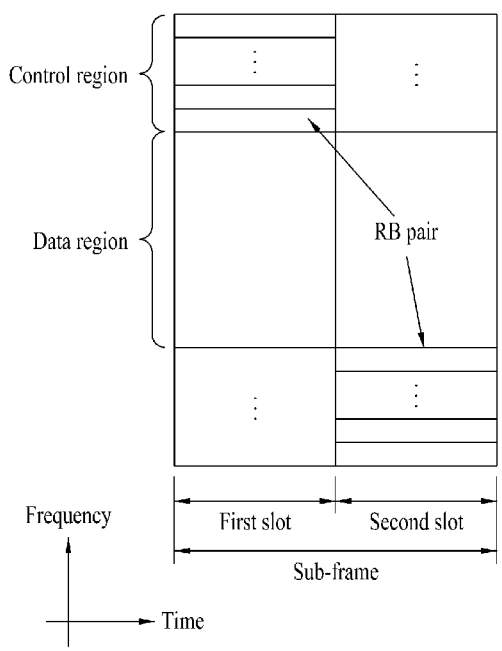
FIG. 5 is a diagram illustrating a structure of an uplink subframe.

FIG. 5 is a diagram illustrating a structure of an uplink subframe in an LTE system.

Referring to FIG. 5, the uplink subframe may be divided into a data region and a control region in a frequency domain. A physical uplink shared channel (PUSCH) carrying user data is allocated to the data region. In order to maintain single carrier properties, one user equipment does not transmit the PUCCH and the PUSCH at the same time. A pair of RBs within the subframe are allocated to the PUCCH for one user equipment. Resource blocks (RBs) belonging to the pair of RBs reserve different subcarriers for two slots. The RB pair allocated to the PUCCH is subjected to frequency hopping at a slot boundary.

1.2 Downlink Reference Signal

In the wireless communication system, since data/signal is transmitted through a radio channel, the data/signal may be distorted on the radio during transmission. In order to normally receive the distorted signal, it is preferable that distortion of the received signal should be compensated using channel information. At this time, a reference signal (RS) known by both a transmitter and a receiver may be used by the transmitter and/or the receiver to detect channel information. The reference signal may be referred to as a pilot signal.

When the transmitter transmits and receives data by using multiple antennas, it is preferable that a channel status between each transmitting antenna and each receiving antenna should be detected, whereby the receiver may receive the data exactly. At this time, it is preferable that each transmitting antenna of the transmitter has its individual reference signal to detect the channel status.

Examples of the downlink reference signal include a common reference signal (CRS) shared by all the user equipments within one cell and a dedicated reference signal (DRS) for a specific user equipment only. The transmitter may provide information for demodulation and channel measurement to the receiver by using these reference signals (CRS and DRS).

The receiver (for example, user equipment) may measure the channel status by using the CRS, and may feed an indicator related to channel quality, such as a channel quality indicator (CQI), a precoding matrix index (PMI), and/or a rank indicator (RI), back to the transmitter (for example, base station) in accordance with the measured channel status. On the other hand, a reference signal related to feedback of the channel status information (CSI) may be referred to as CSI-RS.

The DRS may be transmitted to the user equipments through resource elements if data demodulation on the PDSCH is required. The user equipment may receive the presence of the DRS through upper layer signaling. The DRS is useful only if the corresponding PDSCH signal is mapped. In the embodiments of the present invention, the DRS may be referred to as a user equipment specific reference signal (UE-specific RS) or demodulation reference signal (DMRS).

FIG. 6 is a diagram illustrating a reference signal pattern mapped into a pair of downlink resource blocks (RBs) defined in a 3GPP LTE-A system.

A pair of downlink resource blocks (RBs) may be set by one subframe on a time domain×twelve subcarriers on a frequency domain as a mapping unit of the reference signal. In other words, a pair of resource blocks on a time axis (axis 'x') have a length of 14 OFDM symbols (see FIG. 6(a)) in case of normal cyclic prefix (CP) and has a length of 12 OFDM symbols in case of extended cyclic prefix (CP) (see FIG. 6(b)).

Referring to FIG. 6, resource elements (REs) marked with '0', '1', '2' and '3' in each resource block mean the resource elements into which CRS corresponding to each of antenna ports '0', '1', '2' and '3' of the transmitter (for example, base station) is mapped, and resource elements marked with 'D' mean the resource elements into which DRS is mapped.

Hereinafter, the CRS will be described in more detail.

The CRS is the reference signal that may be received by all the user equipments located within the cell, is distributed on the overall frequency band, and may be used to estimate a channel of a physical antenna. Also, the CRS may be used for channel quality information (CSI) and data demodulation.

The CRS may be defined by various formats in accordance with antenna arrangement at the transmitter (for example, base station). In the 3GPP LTE system (for example, Rel-8/9), the transmitter may support maximum four transmitting antennas.

When multi input multi output antennas are supported and the reference signals are transmitted from one or more antenna ports, the reference signals are transmitted through specific resource elements in accordance with a predetermined pattern. At this time, a reference signal for one antenna port is not transmitted to a resource element to which a reference signal for another antenna port is transmitted. In other words, the reference signals between different antennas are not overlapped with each other.

2. Method for Measuring Channel Quality

Heterogeneous network/deployments mean that a micro cell for low power/short distance communication exists in a macro cell based homogeneous network. The micro cell may be referred to as a pico cell, a femto cell, a home evolved node B (HeNB), and a relay.

The macro cell (or macro base station) has broad coverage and high transmission power and means a normal cell (or base station) of the wireless communication system. Also, the micro cell (or micro base station) which is a small version of the macro cell may be operated independently while performing most of functions of the macro cell, and means either a cell (or base station) which may be overlaid in a zone covered by the macro cell or a non-overlay type cell (or base station) which may be overlaid in a shade zone where is not covered by the macro cell. The micro cell has narrow coverage and low transmission power and may accept a smaller number of user equipments.

The user equipment may directly be served from the macro cell or the micro cell. Also, in any case, the user equipment existing within coverage of the micro cell may be served from the macro cell.

The micro cell may be classified into two types depending on access limit of the user equipment. The first type is a closed subscriber group (CSG) cell, and means a cell which does not allow access of the existing macro user equipment (user equipment served from the macro cell) or the other micro user equipments (user equipments served from the micro cell). The second type is an open access subscriber group (OASC) or open subscriber group (OSC) cell, and means a cell which allows access of the existing macro user equipment or the other micro user equipments.

In the heterogeneous network environment where the macro cell and the micro cell coexist, inter-cell interference may occur more seriously than that of the homogeneous network environment where the macro cell (or micro cell) exists only. In other words, accuracy of reference signal received power/reference signal received quality (RSRP/RSRQ) essential for radio resource management and measured by the user equipment located at the boundary of cells overlapped with each other under the heterogeneous network environment may be deteriorated significantly as signals transmitted between the cells act as mutual interference.

In this respect, in the 3GPP LTE-A system, studies for enhanced inter-cell interference coordination (eICIC) have been made actively as one of methods of coordinating interference between base stations. According to the method, a cell causing interference may be defined as an aggressor cell or primary cell while a cell affected by interference may be defined as a victim cell or secondary cell, and the aggressor cell or primary cell stops data transmission for a specific subframe, whereby the user equipment may maintain connection with the victim cell or secondary cell for the specific subframe. In other words, in this method, if the macro cell and the micro cell coexist, one base station temporarily stops signal transmission to the user equipment affected by high interference at some zone so as to rarely transmit an interference signal. For this interval, the user equipment performs RSRP/RSRQ measurement for a signal of another base station.

In the 3GPP LTE/LTE-A system, a cell specific reference signal (CRS) is transmitted through the $0^{th}$, $4^{th}$, $7^{th}$ and $11^{th}$ OFDM symbols within each subframe on the time axis, and is basically used to measure RSRP and RSRP. In other words, the user equipment measures RSRP and RSRQ by using the CRS received from each of the macro cell and the micro cell. For example, if the serving cell of the user equipment corresponds to the macro cell and the micro cell corresponds to a neighboring cell, the user equipment measures RSRP and RSRQ of the serving cell through the CRS from the macro cell, and measures RSRP and RSRQ of the neighboring cell through the CRS from the micro cell.

In the LTE-A system to which eICIC is applied, for compatibility with the user equipment of the existing LTE system, instead of a separate subframe, a subframe, for which data except for a minimum signal essential for the operation of the user equipment including the CRS are not allocated, is used. In other words, the macro cell provides a subframe called ABS (or ABSF: almost blank subframe) to the user equipment served from the micro cell, especially the user equipment located at the boundary of overlapped cells, whereby the user equipment may be protected from robust interference caused by the macro cell as a downlink control channel and a data channel other than the CRS are not transmitted for the ABSF. However, if the ABS is coincident with a multicast broadcast single frequency network (MBSFN) subframe for which no signal is transmitted from a data area, the CRS is not transmitted from the data area of the ABS. In other words, in case of the MBSFN ABS, the other CRSs except for the first CRS (CRS transmitted at the $0^{th}$ OFDM symbol) are removed, whereby interference between the CRSs may be removed.

Under the eICIC status, a subframe type of each base station may be noted by signal exchange through mutual X2 interface connection between the macro cell and the pico cell. For example, the macro cell or the pico cell exchanges information on the MBSFN subframe and information on the subframe operated as ABS through X2 interface based signaling.

On the other hand, since X2 interface does not exist between the macro cell and the femto cell, ABS pattern which is previously defined is applied to the femto cell through operation, administration and maintenance (OAM). For example, the femto cell may acquire MBSFN subframe information of the macro cell by receiving system information wirelessly broadcasted from the macro cell, or may acquire MBSFN subframe information of the macro cell from a controller of a core network.

Figure 7:
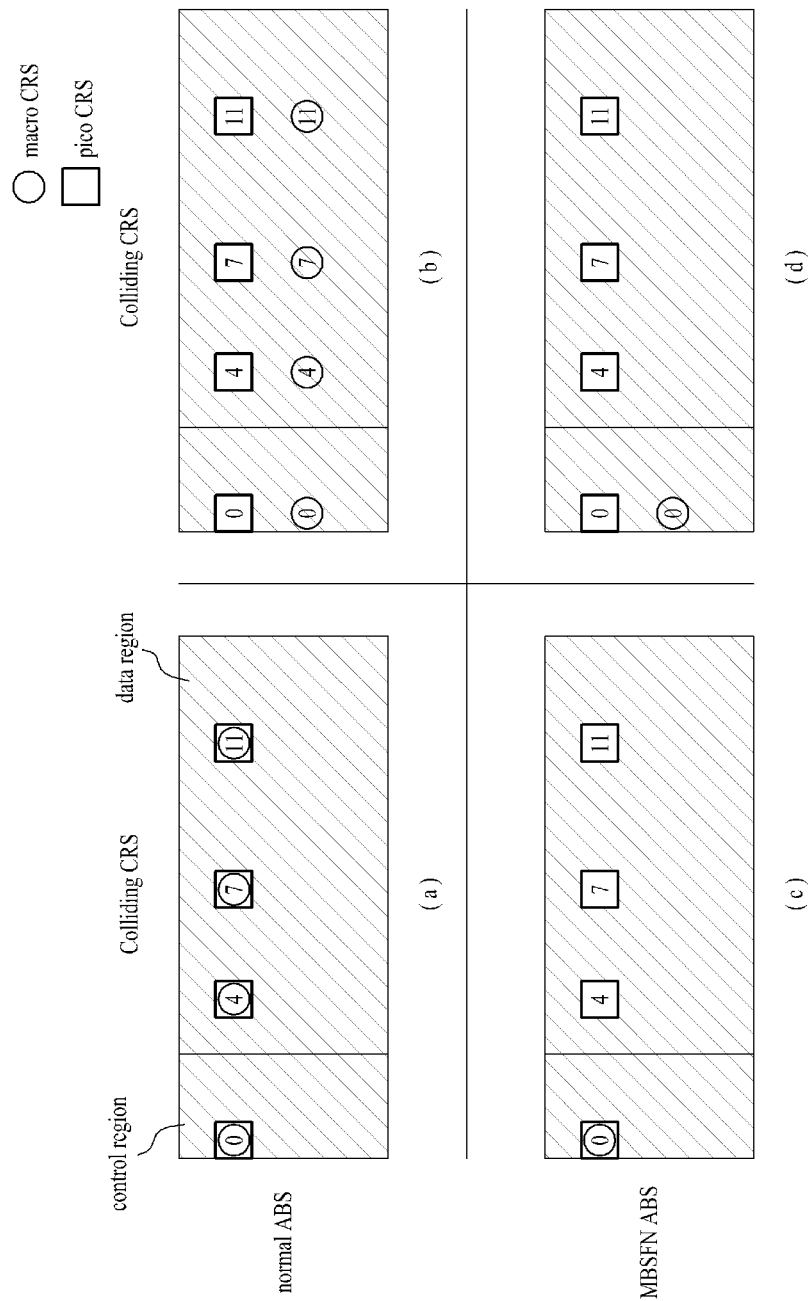
FIG. 7 is a diagram illustrating an example of ABS pattern of a macro cell and a pico cell in a system to which eICIC is applied.

FIG. 7 is a diagram illustrating an example of ABS pattern of a macro cell and a pico cell in a system to which eICIC is applied.

Referring to FIG. 7, if eICIC is used, four cases may generally exist in accordance with a signal transmission pattern between two base stations.

FIG. 7(a) illustrates normal ABS with colliding CRS. In other words, in FIG. 7(a), when subframe types of the macro cell and the pico cell are normal subframes, the CRS location of the macro cell and the CRS location of the pico cell are the same as each other. In this case, the CRSs are overlapped with each other and act as mutual interference, whereby signal transmission throughput is deteriorated remarkably.

FIG. 7(b) illustrates normal ABS with non-colliding CRS. In other words, in FIG. 7(b), when subframe types of the macro cell and the pico cell are normal subframes, the CRS location of the macro cell and the CRS location of the pico cell are different from each other. In this case, mutual interference between the CRSs does not exist.

FIG. 7(c) illustrates MBSFN ABS with colliding CRS. In other words, in FIG. 7(c), when a subframe type of the macro cell is MBSFN subframe and a subframe type of the pico cell is a normal subframe, the locations of the CRS transmitted at the 0th symbol are the same as each other. Since the subframe type of the macro cell is the MBSFN subframe, although no CRS of the macro cell exists at the other $4^{th}$, $7^{th}$ and $11^{th}$ symbols, the CRSs transmitted through the $0^{th}$ symbol are overlapped with each other and act as mutual interference.

FIG. 7(d) illustrates MBSFN ABS with non-colliding CRS. In other words, in FIG. 7(d), when a subframe type of the macro cell is MBSFN subframe and a subframe type of the pico cell is a normal subframe, the locations of the CRS transmitted at the 0th symbol are different from each other. Since the subframe type of the macro cell is the MBSFN subframe, although no CRS of the macro cell exists at the other $4^{th}$, $7^{th}$ and $11^{th}$ symbols, the locations of the CRSs transmitted through the $0^{th}$ symbol are different from each other, whereby mutual interference between the CRSs does not exist.

If eICIC is not used, even though a random one of neighboring cells transmits the subframe set to the MBSFN, since all the CRSs are transmitted for the subframe, the user equipment performs RSRP/RSRQ measurement by using all the CRSs regardless of CRS interference with the neighboring cell. On the other hand, if eICIC is used in the LTE/LTE-A system and a neighboring cell is set to MBSFN, since the CRS is transmitted at the first OFDM symbol only of each subframe for the MBSFN subframe of the neighboring cell, the user equipment should measure RSRP/RSRQ by using the first CRS only of each slot. However, as described above, if eICIC is used, the user equipment may know that the subframe of the current serving cell is normal subframe or MBSFN subframe but may not know whether the subframe of the neighboring cell is MBSFN subframe. In this way, since the user equipment does not know the neighboring cell to which MBSFN subframe is transmitted, accuracy of measurement may be deteriorated.

In measuring RSRP/RSRQ, a subframe type of a cell (hereinafter, referred to as measurement cell) to be measured and the presence of a neighboring cell (hereinafter, referred to as interference cell) causing interference may be identified as follows.

Figure 8:
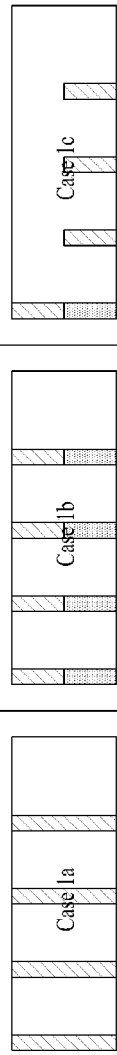
FIG. 8 is a diagram illustrating a measurement signal of a user equipment in a system to which eICIC is applied.

FIG. 8 is a diagram illustrating a measurement signal of a user equipment in a system to which eICIC is applied.

In FIG. 8, in order to measure RSRP/RSRQ of the user equipment, the locations of the CRSs transmitted from the measurement cell and the interference cell are illustrated in a subframe unit. In FIG. 8, the location on a horizontal axis of each bar graph marked in FIG. 8 represents the location of the OFDM symbol to which the CRS is transmitted for the corresponding subframe, and the size on a vertical axis of each bar graph represents the received power of the CRS. At this time, variation on the time axis of path loss that affects the received power of the CRS may be almost uniform within the corresponding subframe.

The measurement cell will be referred to as $C_{Normal}$ or $C_{MBSFN}$ in accordance with the subframe type (normal subframe or MBSFN subframe) of the measurement cell to be measured, and the interference cell will be referred to as $I_{Normal}$ or $I_{MBSFN}$ in accordance with the subframe type (normal subframe or MBSFN subframe) of the interference cell. Also, in FIG. 8, each bar marked with slash lines represents the CRS transmitted for the corresponding subframe of the measurement cell, and each bar marked with dots represents the CRS transmitted for the corresponding subframe of the interference cell.

As described above, in the existing LTE system, although the CRS exists at the $0^{th}$, $4^{th}$, $7^{th}$ and $11^{th}$ OFDM symbols even in case of the MBSFN subframe, the CRS is transmitted at the first OFDM symbol only for the MBSFN ABS if eICIC is applied to the system, no CRS is transmitted at the $4^{th}$, $7^{th}$ and $11^{th}$ OFDM symbols.

Cases 1a, 1b, and 1c illustrate that the subframe of the measurement cell corresponds to the normal subframe, and the CRS is transmitted at the $0^{th}$, $4^{th}$, $7^{th}$ and $11^{th}$ OFDM symbols of the subframe of the measurement cell. The case 1a illustrates that an interference signal from the interference cell does not exist. The case 1b illustrates that interference signals exist at the $0^{th}$, $4^{th}$, $7^{th}$ and $11^{th}$ OFDM symbols as the subframe of the interference cell corresponds to the normal subframe. Also, the case 1c illustrates that an interference signal exists only at the $0^{th}$ OFDM symbol as the subframe of the interference cell corresponds to the MBSFN subframe.

Cases 2a, 2b, and 2c illustrate that the subframe of the measurement cell corresponds to the MBSFN subframe, and the CRS is transmitted at the $0^{th}$ OFDM symbol only of the subframe of the measurement cell. The case 2a illustrates that an interference signal from the interference cell does not exist. The case 2b illustrates that interference signals exist at the $0^{th}$, $4^{th}$, $7^{th}$ and $11^{th}$ OFDM symbols as the subframe of the interference cell corresponds to the normal subframe. Also, the case 2c illustrates that an interference signal exists only at the $0^{th}$ OFDM symbol as the subframe of the interference cell corresponds to the MBSFN subframe.

As described above, various cases may occur in accordance with the subframe types of the measurement cell and the interference cell. In this respect, a method for effectively measuring RSRP or RSRQ of the user equipment will be suggested.

Figure 9:
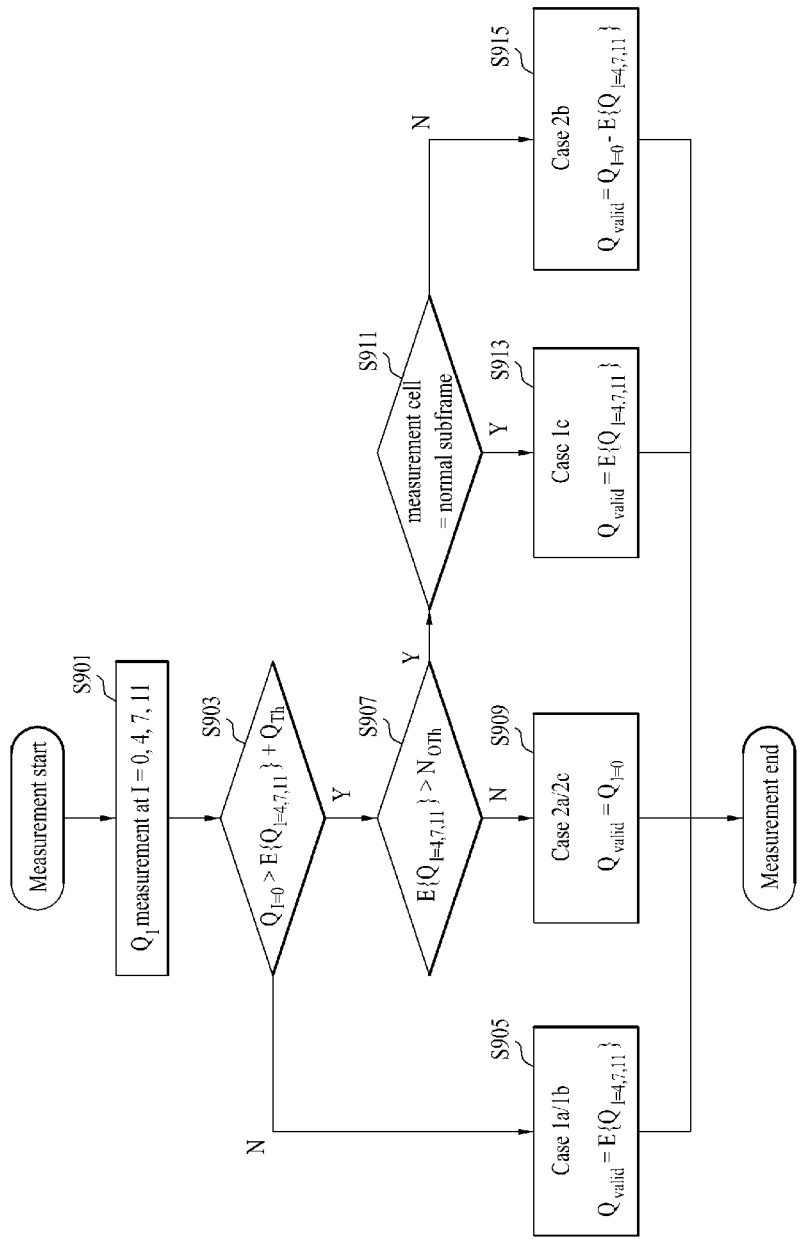
FIG. 9 is a diagram illustrating a method of measuring channel quality based on blind detecting according to one embodiment of the present invention.

FIG. 9 is a diagram illustrating a method of measuring channel quality based on blind detecting according to one embodiment of the present invention.

In FIG. 9, $Q_1$ means an instantaneous value for channel quality estimated (or measured) at the first OFDM symbol, and $E(Q_{1=4,7,11})$ means an average of instantaneous values for channel quality estimated (or measured) at the $4^{th}$, $7^{th}$ and $11^{th}$ OFDM symbols. Also, $Q_{Th}$ means a reference value when there is a difference between $Q_0$ and $E(Q_{1=4,7,11})$ in measurement due to the presence of the MBSFN cell, and $No_{Th}$ means a reference value for excluding a case where no CRS exists. Four types of measurement methods exist in accordance with the procedure of FIG. 9, whereby a measured value for selected channel quality is selected as a value of $Q_{Valid}$ to be reported to the base station (or network).

Referring to FIG. 9, the user equipment estimates the measurement value $Q_1=0,4,7,11$ for the $0^{th}$, $4^{th}$, $7^{th}$ and $11^{th}$ OFDM symbols to which the CRS is transmitted for each subframe to be measured (S901).

At the step S901, the user equipment which will perform cell measurement for the $0^{th}$, $4^{th}$, $7^{th}$ and $11^{th}$ OFDM symbols compares the instantaneous value $Q_0$ measured at the $0^{th}$ OFDM symbol with the average $E(Q_{1=4,7,11})$ of the instantaneous values measured at the $4^{th}$, $7^{th}$ and $11^{th}$ OFDM symbols and determines whether the difference between $Q_0$ and $E(Q_{1=4,7,11})$ is greater than $Q_{Th}$ (S903).

At the step S903, if $Q_0$ is greater than $E(Q_{1=4,7,11})$ as much as $Q_{Th}$, the user equipment determines that the measurement cell and the interference cell are all the normal subframes and selects an average value $E(Q_{1=0,4,7,11})$ of estimation values of all the OFDM symbols to which the CRS is transmitted, as $Q_{Valid}$ (S905). In other words, the user equipment determines the case 1a or 1b of FIG. 2, and reports an average value of the estimation values of all the OFDM symbols to the base station (or network).

On the other hand, at the step S903, if $Q_0$ is greater than $E(Q_{1=4,7,11})$ as much as $Q_{Th}$, the user equipment determines that the MBSFN subframe exists at the measurement cell or the interference cell. In this case, the user equipment again compares $E(Q_{1=4,7,11})$ with $No_{Th}$ (S907). In other words, the user equipment determines whether the CRS is transmitted at the $4^{th}$, $7^{th}$, and $11^{th}$ OFDM symbols.

At the step S907, if $E(Q_{1=4,7,11})$ is smaller than $No_{Th}$, the user equipment determines all the cells correspond to the MBSFN subframes, and selects $Q_0$ as $Q_{Valid}$ (S909). In other words, the user equipment determines the case 2a or 2b of FIG. 8, and reports the estimation value of the $0^{th}$ OFDM symbol to the base station (or network).

On the other hand, at the step S907, if $E(Q_{1=4,7,11})$ is greater than $No_{Th}$, the user equipment determines that the normal subframe and the MBSFN ABS coexist in the measurement cell and the interference cell, and determines whether the measurement cell is the normal subframe (S911). In other words, the normal subframe and the MBSFN ABS coexist in the measurement cell and the interference cell, and since the user equipment may not know whether the subframe type of the serving cell is the normal subframe or the MBSFN subframe, the user equipment may know the subframe type of the measurement cell in accordance with the subframe type of the serving cell. For example, if the measurement cell is the serving cell currently used by the user equipment, the user equipment may know that the subframe type of the serving cell is the same as that of the serving cell. Also, by contrast, if the measurement cell is not the serving cell currently used by the user equipment, the user equipment may determine that the subframe of the measurement cell is the MBSFN subframe if the subframe of the serving cell is the normal subframe, and may determine that the subframe of the measurement cell is the normal subframe if the subframe of the serving cell is the MBSFN subframe.

At the step S911, if the subframe type of the measurement cell is the normal subframe, the user equipment determines that the subframe type of the cell causing interference is the MBSFN subframe, and selects $E(Q_{1=4,7,11})$ except for $Q_0$ having interference as $Q_{Valid}$ (S913). In other words, the user equipment determines the case 1c of FIG. 8, and reports an average value of the estimation value of the $4^{th}$, $7^{th}$, and $11^{th}$ OFDM symbols except for the $0^{th}$ OFDM symbol to the base station (or network).

At the step S911, if the subframe type of the measurement cell is not the normal subframe, the user equipment determines that the subframe type of the cell causing interference is the normal subframe, and selects a value obtained by subtracting $E(Q_{1=4,7,11})$ from $Q_0$ as $Q_{Valid}$ (S915). In other words, since the signal of the measurement cell is transmitted at the $0^{th}$ OFDM symbol only, the signal exists in the instantaneous measurement value $Q_0$ only. However, since the signal of the interference cell is transmitted at all the $0^{th}$, $4^{th}$, $7^{th}$ and $11^{th}$ OFDM symbols, the signal exists in all the instantaneous measurement values $Q_0$, $Q_4$, $Q_7$ and $Q_{11}$. Accordingly, the user equipment reports the value obtained by subtracting $E(Q_{1=4,7,11})$ from $Q_0$ to the base station (or network) to improve reliability.

Through the aforementioned steps, the user equipment may estimate whether the subframe of the neighboring cell is the MBSFN subframe. As a result, the user equipment may effectively measure RSRP/RSRQ of the cell to be measured. Moreover, in the wireless access system to which the eICIC technology is applied, communication quality may be improved and the capacity of the overall system may be increased.

3. General Apparatus to which Present Invention May be Applied

FIG. 10 is a block diagram illustrating a communication apparatus according to one embodiment of the present invention.

Referring to FIG. 10, the wireless communication system includes a base station 100 and a plurality of user equipments 110 located within a zone of the base station 100.

The base station 100 includes a processor 101, a memory 102, and a radio frequency (RF) unit 103. The processor 101 may be configured to implement functions, procedures and/or methods suggested in the present invention. Layers of a radio interface protocol may be implemented by the processor 101. The memory 102 is connected with the processor 101 and stores various kinds of information for driving the processor 101. The RF unit 103 is connected with the processor 101 and transmits and/or receives a radio signal.

The user equipment 110 includes a processor 111, a memory 112, and a radio frequency (RF) unit 113. The processor 111 may be configured to implement functions, procedures and/or methods suggested in the present invention. The memory 112 is connected with the processor 111 and stores various kinds of information for driving the processor 111. The RF unit 113 is connected with the processor 111 and transmits and/or receives a radio signal.

The memory 102 or 112 may be located inside or outside the processor 101 or 111, and may be connected with the processor 101 or 111 by means which are well known. Also, the base station 100 and/or the user equipment 110 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for transmitting and receiving data in a wireless access system of the present invention has been described based on the 3GPP LTE system, the method may be applied to various wireless access systems in addition to the 3GPP LTE system.

The invention claimed is:

1. A method of allowing a user equipment to measure channel quality in a wireless access system, the method comprising the steps of:
measuring channel quality by using each CRS (cell-specific reference signal) transmitted at $0^{th}$, $4^{th}$, $7^{th}$ and $11^{th}$ OFDM (orthogonal frequency division multiplexing) symbols of each subframe;
determining whether a channel quality measurement value at the $0^{th}$ OFDM symbol is greater as much as a predetermined first threshold value than an average value of channel quality measurement values of the $4^{th}$, $7^{th}$ and $11^{th}$ OFDM symbols; and
transmitting channel quality information to the base station,
wherein the channel quality information is an average value of the channel quality measurement values at $0^{th}$, $4^{th}$, $7^{th}$ and $11^{th}$ OFDM symbols when the channel quality measurement value of the $0^{th}$ OFDM symbol is not grater greater as much as the first threshold value than the average value of channel quality measurement values of the $4^{th}$, $7^{th}$ and $11^{th}$ OFDM symbols.

2. The method according to claim 1, further comprising the step of determining whether the average value of the channel quality measurement values at the $4^{th}$, $7^{th}$ and $11^{th}$ OFDM symbols is greater than a predetermined second threshold value if the channel quality measurement value at the $0^{th}$ OFDM symbol is greater as much as the first threshold value than the average value of the channel quality measurement values at the $4^{th}$, $7^{th}$ and $11^{th}$ OFDM symbols, wherein the channel quality information is the channel quality measurement value at the $0^{th}$ OFDM symbol if the average value of the channel quality measurement values at the $4^{th}$, $7^{th}$ and $11^{th}$ OFDM symbols is smaller than the second threshold value.

3. The method according to claim 2, further comprising the step of determining whether a subframe type of a cell, which measures the channel quality, is a multicast broadcast single frequency network (MBSFN) subframe if the average value of the channel quality measurement values at the $4^{th}$, $7^{th}$ and $11^{th}$ OFDM symbols is greater than the second threshold value, wherein the channel quality information is the average value of the channel quality measurement values at the $4^{th}$, $7^{th}$ and $11^{th}$ OFDM symbols if the subframe type of the cell, which measures the channel quality, is not the MBSFN subframe.

4. The method according to claim 3, wherein the channel quality information is a value obtained by subtracting the average value of the channel quality measurement values at the $4^{th}$, $7^{th}$ and $11^{th}$ OFDM symbols from the channel quality measurement value at the $0^{th}$ OFDM symbol if the subframe type of the cell, which measures the channel quality, is the MBSFN subframe.

5. The method according to claim 1, wherein the channel quality information is at least any one of reference signal received power (RSRP) and reference signal received quality (RSRQ).

6. A user equipment measuring channel quality in a wireless access system, the user equipment comprising:
a radio frequency (RF) unit configured to transmit and receive a radio signal; and
a processor configured to measure channel quality by using each CRS (cell-specific reference signal) transmitted at $0^{th}$, $4^{th}$, $7^{th}$ and $11^{th}$ OFDM (orthogonal frequency division multiplexing) symbols of each subframe from a base station, determine whether a channel quality measurement value at the $0^{th}$ OFDM symbol is greater as much as a predetermined first threshold value than an average value of channel quality measurement values of the $4^{th}$, $7^{th}$ and $11^{th}$ OFDM symbols, and transmit channel quality information to the base station,
wherein the channel quality information is an average value of the channel quality measurement values at $0^{th}$, $4^{th}$, $7^{th}$ and $11^{th}$ OFDM symbols when the channel quality measurement value of the $0^{th}$ OFDM symbol is not greater as much as the first threshold value than the average value of channel quality measurement values of the $4^{th}$, $7^{th}$ and $11^{th}$ OFDM symbols.

7. The user equipment according to claim 6, wherein the processor determines whether the average value of the channel quality measurement values at the $4^{th}$, $7^{th}$ and $11^{th}$ OFDM symbols is greater than a predetermined second threshold value if the channel quality measurement value at the $0^{th}$ OFDM symbol is greater as much as the first threshold value than the average value of the channel quality measurement values at the $4^{th}$, $7^{th}$ and $11^{th}$ OFDM symbols, and the channel quality information is the channel quality measurement value at the $0^{th}$ OFDM symbol if the average value of the channel quality measurement values at the $4^{th}$, $7^{th}$ and $11^{th}$ OFDM symbols is smaller than the second threshold value.

8. The user equipment according to claim 7, wherein the processor determines whether a subframe type of a cell, which measures the channel quality, is a multicast broadcast single frequency network (MBSFN) subframe if the average value of the channel quality measurement values at the $4^{th}$, $7^{th}$ and $11^{th}$ OFDM symbols is greater than the second threshold value, and the channel quality information is the average value of the channel quality measurement values at the $4^{th}$, $7^{th}$ and $11^{th}$ OFDM symbols if the subframe type of the cell, which measures the channel quality, is not the MBSFN subframe.

9. The user equipment according to claim 8, wherein the channel quality information is a value obtained by subtracting the average value of the channel quality measurement values at the $4^{th}$, $7^{th}$ and $11^{th}$ OFDM symbols from the channel quality measurement value at the $0^{th}$ OFDM symbol if the subframe type of the cell, which measures the channel quality, is the MBSFN subframe.

10. The user equipment according to claim 6, wherein the channel quality information is at least any one of reference signal received power (RSRP) and reference signal received quality (RSRQ).

* * * * *